United States Patent [19]
Redenbarger et al.

[11] 3,757,951
[45] Sept. 11, 1973

[54] FLUID FILTER WITH CLOGGING RELIEF MEANS

[75] Inventors: Philip D. Redenbarger, Centerpoint; Ashok Khilnani, Terre Haute, both of Ind.

[73] Assignee: J. I. Case Company, Racine, Wis.

[22] Filed: Feb. 7, 1972

[21] Appl. No.: 224,013

[52] U.S. Cl. .............................................. 210/131
[51] Int. Cl. ...................... B01d 35/14, B01d 27/10
[58] Field of Search ............................ 210/131, 452

[56] References Cited
UNITED STATES PATENTS
2,387,368   10/1945   Vokes ............................... 210/131
3,388,800   6/1968    MacGregor ........................ 210/131
FOREIGN PATENTS OR APPLICATIONS
836,948     6/1960    Great Britain ..................... 210/131

Primary Examiner—Frank A. Spear, Jr.
Attorney—Arthur J. Hansmann

[57] ABSTRACT

A fluid filter with clogging release means and including a filter member for filtering foreign particles from the fluid flowing through the member. A chamber exists in the filter member for receiving the fluid and a fluid inlet connection is in fluid flow communication with the chamber for directing fluid into the chamber. A fluid by-pass passageway is in the fluid inlet connection, and the filter is yieldingly urged relative to the fluid inlet connection to cover and uncover the by-pass passageway in response to fluid pressure in the chamber in the filter. A spring urges the filter over the fluid connection and the by-pass therein, and a stop is provided for limiting the pressure the spring can exert on the filter member.

1 Claim, 2 Drawing Figures

Patented Sept. 11, 1973 3,757,951

FLUID FILTER WITH CLOGGING RELIEF MEANS

This invention relates to a fluid filter with clogging relief means. More particularly, it relates to an oil type of filter which has a built-in relief for use when the filter becomes clogged by either foreign particles or by a high viscosity of oil flowing therethrough.

BACKGROUND OF THE INVENTION

Fluid filters with automatic reliefs for accommodating a clogged filter caused by either foreign particles or high oil viscosity are commonly known in the art. Examples of such filters are found in U.S. Pat. No. 2,747,743 and U.S. Pat. no. 2,734,636 and U.S. Pat. Nos. 2,672,984 and 2,702,638. These prior art filters commonly utilize a spring type of relief valve which permits the by-pass of the oil or medium relative to the filter element itself. That is, when the fluid medium can no longer pass through the filter element, then it can by-pass the element and go directly from the inlet opening to the outlet opening without being filtered.

In these instances of prior art filters with relief means as mentioned, there is no good solution to the problem of controlling the point at which the relief means, whether or not it be a spring-urged type of valve, in its function is permitting the by-pass of the fluid. Further, the prior art arrangement for the by-pass valve or like means is generally complex and therefore expensive in manufacture and also delicate in its operation and therefore not reliable. In other instances, the by-pass valve or element may be too flimsy and unreliable in permitting the by-pass at either a certain degree of filter polution or a certain viscosity.

Accordingly, it is a general object of the present invention to provide an improved type of fluid filter with a relief means which accommodates the polution and the increase in viscosity of the fluid medium.

More specifically, it is an object of this invention to provide a fluid filter which is sturdy and reliable in operation and which also is simplified in its construction, compared to the prior art. In accomplishing these objects, the filter of the present invention is also one which can be readily and easily installed in that in the present invention only one nut or threaded member need be removed for the replacement of the filter element itself.

Still further, the present invention provides for the arrangement of a filter member with a relief means which responds to the pressure of the fluid being filtered, and with the pressure being applied to counter the relief means, but with the relief means having a limit position which therefore easily and automatically determines the amount of pressure required to overcome the relief means.

Still further, it is an object of this invention to provide a simplified, but yet highly reliable, filter which responds to the pressure of the medium being filtered, and with the filter itself being piloted on the fluid inlet connection and on the control means for setting a relief pressure for the filter.

Still another and significant object of this invention, particularly as compared to the art initially cited, is to provide a filter with relief means and to have the relief means operative in a manner which is not affected or obstructed by foreign particles in the fluid. That is, the relief means of the present invention is fully reliable in its action in that it does not tend to remain open, such as by being held open with foreign particles, after it has once been opened due to a clogging of the filter.

Other objects and advantages will become apparent upon reading the following description in light of the accompanying drawings.

DETAILED DESCRIPTION OF THE PREFERRED EMBODIMENT

Figure 1:
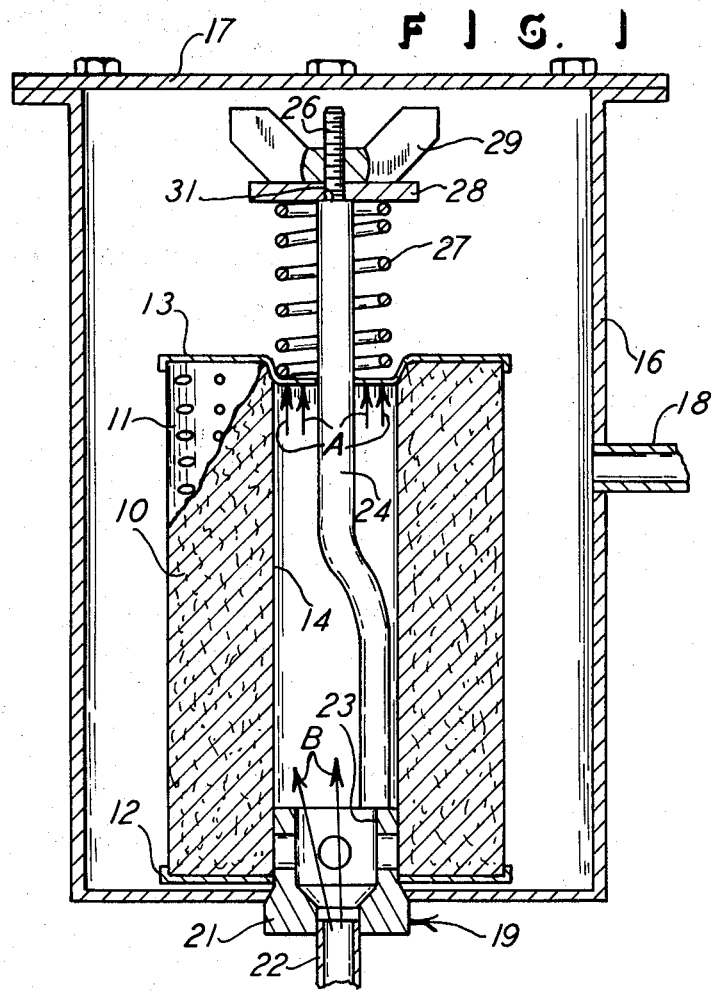
FIG. 1 is a longitudinal sectional view of a preferred embodiment of this invention.

A filter member or element 10 may be of substantially conventional construction in that it has a cylindrical shape with a cylindrical casing 11 and a fixed bottom cover 12 and a top cap 13, so the member 10 is in a unit. Also, it has a cylindrical central chamber 14 extending therethrough as shown. The filter member is disposed within a casing 16 which has a removable cover 17 and which has a fluid outlet connection, such as that shown at 18.

A fluid inlet connection generally designated 19 is connected with the casing 16 and extends therethrough so that inlet fluid can be brought into the filter chamber 14. Thus the fluid inlet connection has a circular boss 21 and an inlet pipe or tube 22 connected together as shown. The boss 21 has a fluid outlet passageway 23 which directs the incoming fluid into the chamber 14 and that fluid will pass through the filter member 10, at least under normal operating conditions when the fluid is being filtered. Of course that fluid may be a hydraulic oil, and if that fluid is contaminated with foreign particles, or if the oil is subjected to a low temperature which causes the viscosity to increase, then the oil will not pass through the filter member 10. Instead, the oil will create a fluid pressure within the chamber 14, and such pressure may be that which is indicated by arrows "A." That is, the oil at arrows "A" resulted from the inlet oil indicated by the arrows "B" extending through the inlet connection 19.

It will be further observed that a guide and mounting rod 24 is connected at its lower end, such as by welding or threading, to the boss 21, and the rod 24 extends through the filter chamber 14 and terminates in an upper threaded end 26. A compression spring 27 is concentric with the rod 24 and the lower end of the spring thus bears downwardly on the filter cap 13, and the upper end of the spring 27 thus bears upwardly on a washer 28 which is held on the rod 24 by means of a threaded wing member 29 threaded on the rod threaded end 26. The washer 28 abuts a shoulder 31 on the rod 24, and thus the pressure which the threaded member or wing nut 29 can apply to the spring 27 is set and limited, in a desirable manner.

It will then be further seen that the spring 27 yieldingly urges the filter member 10 downwardly to have the filter member 10 telescoped over the cylindrical end of the boss 21, as shown in FIG. 1. Further, the filter member 10 is fluid tight with the boss 21 but is axially slidable thereon so that the filter member can actually slide upwardly on the boss 10 in response to the fluid pressure within the chamber 14 and as indicated by the arrows "A."

Figure 2:
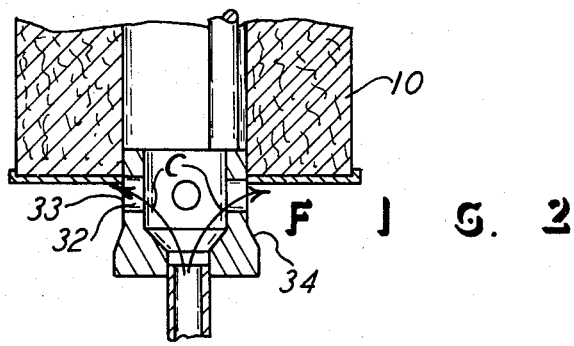
FIG. 2 is a longitudinal sectional view of a lower fragment of that shown in FIG. 1, but showing the filter member in a different position.

That is, when the fluid pressure is of a certain value within the chamber 14, then the filter element 10 will be forced upwardly against the spring 27 and the fluid coming through the inlet connection 19 can by-pass the filter 10 and go directly to the casing 16. FIG. 2 shows this raised position of the filter member 10, and it will here be seen that the fluid flow arrows designated C"c" indicate that the incoming fluid will pass through by-pass passageways 32 when the filter member 10 has slid upwardly on the side wall 33 of the boss 21 so that the by-pass passageways 32 are uncovered, as indicated in FIG. 2. That is, the filter member 10 normally blocks the flow of fluid through the passageways 32 when the filter member 10 is in the FIG. 1 position, since the filter member 10 is fluid-tight with the conical wall 33. The member 21 is also shown to have a conical wall 34 fully spaced from the by-pass passageways 32 and which serves as a stop for the lower end of the filter member 10 when the latter is urged downwardly by the spring 27, as seen in FIG. 1.

Thus, when the fluid being filtered has foreign particles sufficient to clog the filter member 10, or when the viscosity of the fluid is sufficiently high to create sufficient pressure within the chamber 14, then the filter member 10 will be forced upwardly and the by-pass 32 will be uncovered and permit the fluid to by-pass the filter 10. The structure is arranged for easy and accurate replacement of the filter member 10 in that it is piloted on the boss 21 and extends over the guide rod 24. Further, the rod 24 has the limit stop or shoulder 31 so that the proper pressure can be applied to the filter member 10 through the proper compressing of the spring 27, without operator adjustment or error. Still further, if foreign particles were flowing through the by-pass passageways 32, they would not be likely to preclude the closing of the passageways 32 by having the filter 10 slide down on the boss 21, so the foreign particles would not inadvertently cause the by-pass to remain open because the passageways 32 are closed over by the filter wall 14 before the end 12 of the filter would move to the wall 34.

What is claimed is;

1. A fluid filter with clogging relief means, comprising a fluid inlet connection having a fluid outlet opening and a fluid by-pass passageway, a fluid filter member for filtering of foreign particles from the fluid flowing through said filter member and having a chamber defined by an encircling wall for receiving the fluid to be filtered, said filter member being snugly telescopically disposed on said inlet connection and with its said wall covering said by-pass passageway to have fluid in said passageway normally blocked by said filter member from flowing out said passageway, a stop operatively associated with said filter member and being fully spaced from said by-pass passageway for limiting movement of said filter member over said by-pass passageway, a compression spring operatively associated with said filter member for yieldingly urging said filter member in the direction to block said passageway, said filter member being movably mounted for movement in the opposite direction and clear of said passageway under the influence of fluid pressure in said chamber for the flow of fluid through said passageway for by-passing said filter member when said fluid pressure in said chamber exceeds the force exerted by said spring, a threaded rod extending through said chamber and from said fluid inlet connection and in the direction beyond one end of said filter, a threaded member on said rod and disposed to force onto said spring for securing said filter member in place, a limit stop operative on said threaded member for limiting the force exertable by said spring onto said filter member, said fluid outlet opening existing in said end of said fluid inlet connection and with said fluid by-pass passageway existing in the side wall of said fluid inlet connection, and said filter member being telescoped on said fluid inlet connection and extending on said side wall and over said fluid by-pass passageway and being movable in the direction of the longitudinal axis of said rod and relative to said fluid inlet connection to uncover said fluid by-pass passageway when said filter member is moved against the influence of said spring.

* * * * *